(No Model.) 2 Sheets—Sheet 1.
G. A. HENDERSON.
WATER MOTOR.
No. 252,106. Patented Jan. 10, 1882.
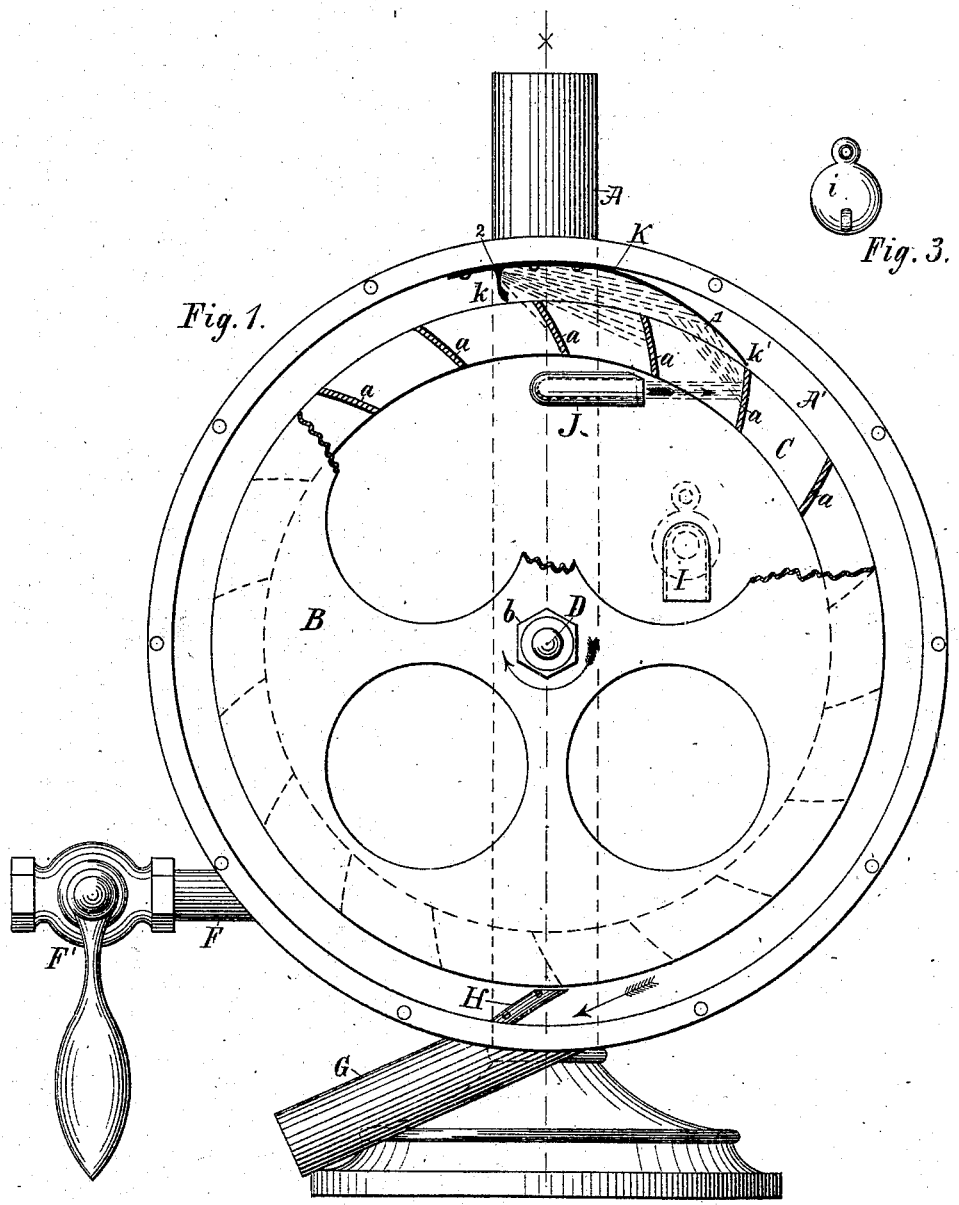
Witnesses.
W. B. Fuller
John B. Bixby
Inventor.
George H. Henderson
By John C. Dupee
Atty.

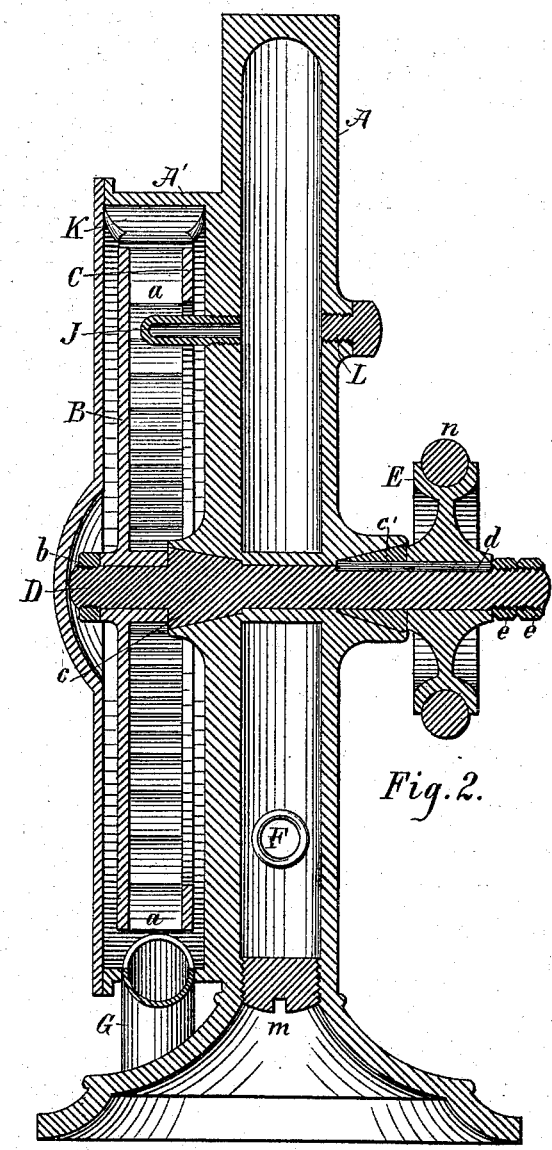

UNITED STATES PATENT OFFICE.

GEORGE A. HENDERSON, OF DECATUR, ILLINOIS.

WATER-MOTOR.

SPECIFICATION forming part of Letters Patent No. 252,106, dated January 10, 1882.

Application filed July 28, 1881. (No model.)

*To all whom it may concern:*

Be it known that I, GEORGE A. HENDERSON, a citizen of the United States, residing at Decatur, in the county of Macon and State of Illinois, have invented a new and useful Improvement in Water-Motors, of which the following is a specification.

My invention relates to certain new and useful improvements in water-motors; and it consists, first, in providing an inside jet-wheel having open buckets set at such an angle in relation to the jet that the dead water is thrown out of the wheel the instant after it has struck; second, the use of buckets having an evolute curve determined by the inner and outer circles of the wheel, which limit the bucket so that the angle presented to the jet is constant for all positions; third, the use of an irregular scroll attached to the case above the jet-tube, to further utilize the water after leaving the bucket; and, fourth, the use of the covered air-duct, by which, under certain circumstances, the power of the jet may be increased. I attain these objects by the device illustrated in the accompanying drawings, in which—

Figure 1 is a side elevation of the motor, having the cover removed from the case and the wheel broken out to show the buckets, jet-tube, and air-duct. Fig. 2 is a vertical transverse section on the line *x x*, Fig. 1. Fig. 3 is a plan of the adjustable cover to air-duct.

Similar letters refer to similar parts throughout the several views.

A represents the penstock, having a bell-shaped base.

A' is the case, and is formed onto the side of the penstock when cast.

B is the wheel which revolves within the case, and consists of a sheet-metal disk the required diameter to suit the case. Onto this disk the buckets *a* are rigidly attached at equal distances apart, each forming an evolute curve determined by the inner and outer circles of the wheel, said inner circle being that of the sheet-metal ring which forms one side of the wheel, as shown at C, Fig. 2.

D is the shaft onto which the wheel B is mounted, and secured thereto by nut *b*. Said shaft rests in conical bearings formed in each side of the penstock, as shown at *c c'*, Fig. 2, one cone being formed solid on the shaft, while the opposite end is provided with a conical sleeve fitted loosely onto the shaft, and is secured thereto by a key, *d*, and nuts *e e*. The tube within which the shaft rests, as shown in drawings, forms a part of the penstock. It will be obvious that a brass tube screwed into the penstock may be substituted therefor.

F is the inlet-pipe, provided with a valve, F'.

G is the discharge-pipe, and is set in a position relative to the inner circle of the case and the revolution of the wheel to admit of an easy passage of the dead water from the case. Over the inner orifice of this outlet-tube, and attached to the case, is a curved partition H, by means of which the dead water is instantly and effectually thrown from the case.

I is the covered air-duct, which may be placed above or parallel with the center line of the case, as shown, and is provided with an adjustable swinging cover, *i*, Fig. 3, so that when it is desirable to use the waste water as a means to partially exhaust the air from the case, and thereby materially increase the power of the jet, it may be done.

J is the jet-tube, shown in section in Fig. 2 and whole in Fig. 1. In this figure it will be seen that the water in passing out of the jet-tube, as indicated by dotted lines and arrow, strikes the bucket first at the point nearest the fulcrum of the wheel, and as the wheel moves so does its leverage increase. To assist in first starting the wheel an irregular scroll, K, is inserted at the top of the case, on the inside, the rear lower portion, *k*, of which is set a little back of the jet-tube J, and its forward end, *k'*, extends forward to the bucket which is being operated upon by the jet.

By reference to Fig. 1 it will be seen that when the wheel is stopped and water admitted thereto through the jet-tube J, as indicated by dotted lines, it strikes the bucket at an angle sufficient to throw it upward against the scroll at 1, thence at 2, from which point its course is turned downward and forward, so that it will operate upon two of the buckets back of the one first acted upon, thereby increasing the effective power of the water thus admitted.

It is obvious that the action above described must take place, to a greater or less extent, whenever the speed of the wheel is materially less than that of the jet. The penstock extends above the case and forms an air-chamber for the purpose of lessening the shock on the motor when water is at first admitted.

The opening L, directly opposite the jet-tube, through the penstock is provided for the purpose of cleaning out the jet-tube, and is closed by a screw. Access may be had to the penstock through the opening at the lower end for any purpose. This opening is also closed by a screw, m.

The pulley E, being grooved, is designed for use with an elastic band or ring, as shown; or a belt may be used to transmit motion to a sewing-machine or other light machinery.

In Fig. 2 are shown lips bent in on each side of the scroll K, for the purpose of concentrating the stream and directing it into the buckets of the wheel, in the manner set forth.

Having thus described my invention, what I claim, and desire to secure by Letters Patent, is—

1. In combination with the penstock and open-bucketed wheel, the inside jet-tube, J, placed within the inner circle of the wheel in the manner shown, so that the jet, after operating upon each bucket in succession, as the wheel revolves around it, will pass out through that portion of the wheel containing the buckets and against the scroll K, as and for the purpose set forth.

2. The combination, with the penstock, case, and inside jet-tube, of the wheel having buckets open at each end, with parallel sides by which they are secured to the wheel, each forming an evolute curve, by means of which the angle presented to the jet is constant for all positions, substantially as and for the purpose specified.

3. In combination with the penstock, case, transverse shaft, and wheel, the covered air-duct having an adjustable outer cover, i, substantially as set forth.

4. The combination, with the open-bucketed wheel and penstock, of the irregular scroll K, having lower projections, k, and forward projection, k', for the purpose of further utilizing the otherwise dead water, as herein shown and described.

GEORGE A. HENDERSON.

Witnesses:
JOHN B. BIXBY,
JOHN C. DUPEE.